United States Patent [19]
Mariano

[11] Patent Number: 4,548,075
[45] Date of Patent: Oct. 22, 1985

[54] FAST RESPONSIVE FLOWMETER TRANSDUCER

[75] Inventor: Charles F. Mariano, Framingham, Mass.

[73] Assignee: Dresser Industries, Inc., Dallas, Tex.

[21] Appl. No.: 576,223

[22] Filed: Feb. 2, 1984

[51] Int. Cl.$^4$ ............................ G01F 5/00; G01F 1/68
[52] U.S. Cl. ........................................ 73/202; 73/204
[58] Field of Search .................................. 73/202, 204

[56] References Cited

U.S. PATENT DOCUMENTS

| | | | |
|---|---|---|---|
| 2,594,618 | 4/1952 | Booth, Jr. | 73/204 |
| 3,181,357 | 5/1965 | Benson | 73/204 |
| 3,187,569 | 6/1965 | Los | 73/204 |
| 3,851,526 | 12/1974 | Drexel | 73/202 |
| 3,938,384 | 2/1976 | Blair | 73/204 |
| 4,056,975 | 11/1977 | LeMay | 73/202 |

FOREIGN PATENT DOCUMENTS 1248563 10/1971 United Kingdom ................. 73/204

OTHER PUBLICATIONS

Datametrics Bulletin, No. 831, "Type 821, 822, 831 Mass Flow Transducers", 1982.
MKS Instruments, Inc. Bulletin MFC 11/82, "Mass Flow Control Systems".

Primary Examiner—Herbert Goldstein
Attorney, Agent, or Firm—Daniel Rubin

[57] ABSTRACT

A split flow mass flowmeter transducer in which measuring the rate of fluid flow through the meter is obtained via a thermal signal from a locally heated sensor tube that affords a parallel fluid flow path about the primary flow path through the main meter body. Enabling the measurement signal to respond more rapidly to changes in flow rate is a thermal shunt bridging the heated portion of the sensor tube for substantially equalizing tube temperature at predetermined locations upstream and downstream thereof.

9 Claims, 5 Drawing Figures

U.S. Patent   Oct. 22, 1985   Sheet 1 of 2   4,548,075
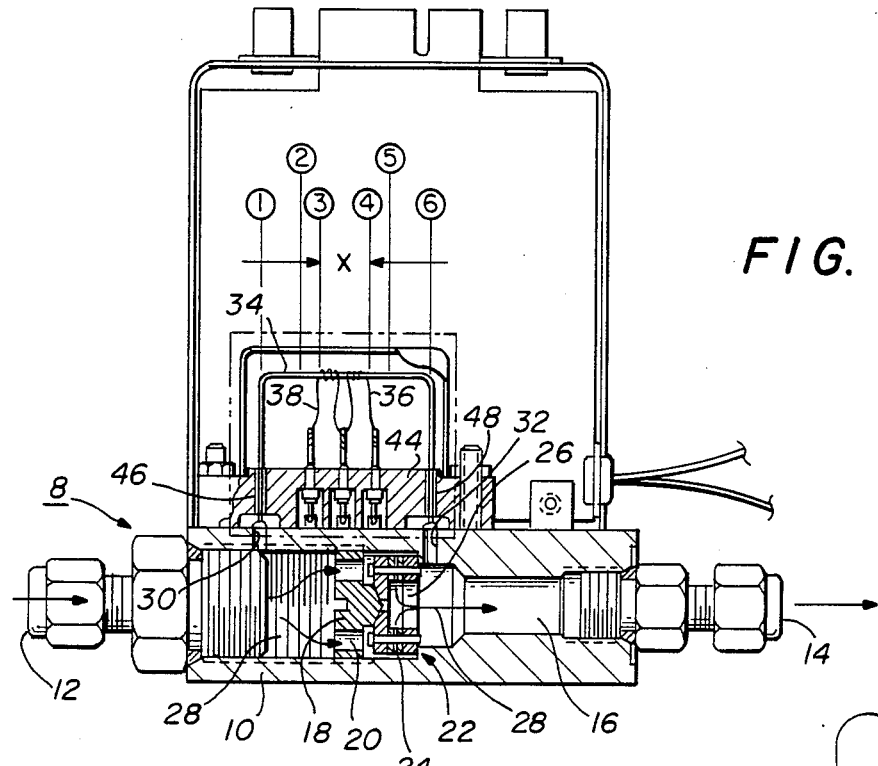
FIG. 1
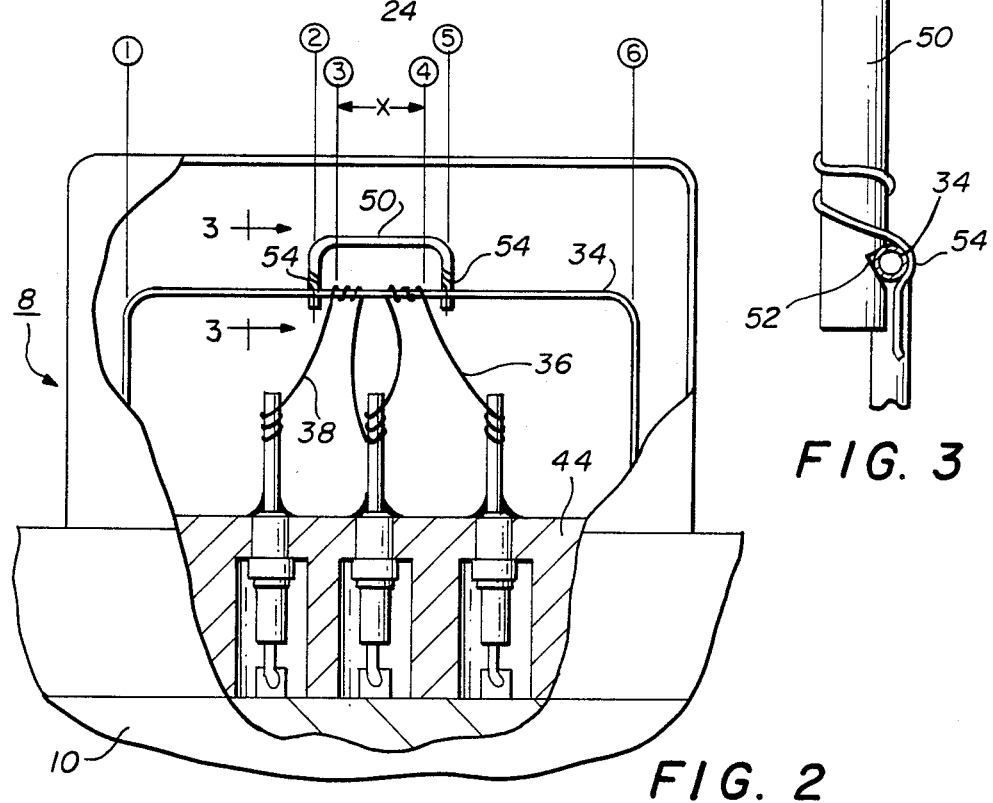
FIG. 2
FIG. 3

4,548,075

FAST RESPONSIVE FLOWMETER TRANSDUCER

TECHNICAL FIELD

The technical field to which the invention relates comprises the field of measuring and testing as applied to flow meters utilizing a thermal type measurement system.

BACKGROUND OF THE INVENTION

Split flow mass flowmeter transducers for obtaining ongoing measurement of fluid flow rate generally operate on the principle of directing fluid flow through two parallel passageways, paths or branches, one of which is utilized as a sensor tube for measuring the mass flow rate of the fluid while the other comprises the primary flow path for the main or non-measuring branch of the meter. The sensor tube is locally heated and measurement is dependent on maintaining a consistency of flow rates between the two branches such that a signal thermally obtained from the sensor tube will accurately reflect the flow rate through the meter as a whole. Thermal measurement in such systems operates on the principle that for a given fluid having a known density, viscosity, specific heat, etc., heat will be absorbed at a fixed rate that is dependent on the mass flow of the fluid passing the heat source per unit of time. Flowmeters of this type are exemplified by the disclosures of U.S. Pat. Nos. 3,792,609 and 4,056,975.

While such constructions are commercially marketed and are well regarded by the consuming public, they are generally characterized as being slow to respond to changes in flow rate occurring within the meter. This is believed attributed to thermal characteristics of the sensor tube caused by axial conduction of heat through the tube wall to relatively long inactive sections of the tube. As a result, long time delays are incurred in reaching equilibrium temperature distribution as changes in flow rate occur. One approach for overcoming the foregoing has been to enhance measurement response by varying the power input to the meter and thereby maintain a more constant temperature profile about the sensor tube. While reasonably effective, the approach is relatively costly to implement and tends toward a nonlinear output which must subsequently be linearized. Despite recognition of the problem, a ready solution thereto has not heretofore been known.

SUMMARY OF THE INVENTION

This invention relates to split flow mass flowmeter tranducers and more specifically to an improvement therefor that effectively enhances the measurement response of the thermal measurement system for changing rates of fluid flow through the meter. This is achieved in accordance with the invention by utilizing a thermal shunt mounted on the sensor tube about the locally heated portion thereof. The shunt is preferably comprised of a slender metal wire, such as aluminum, characterized by good thermal conductivity that is attached to the sensor tube bridging the heated section from which measurement is obtained. Thermal conductivity of the shunt wire between locations on the sensor tube where attached thereto both upstream and downstream of the heated section, effectively isolates the relative temperature profile within the heated section of the tube from the effects of relatively slow temperature changes in the more remote sections of the tube. As a consequence, response time in obtaining the measurement signal with changing flow rates is substantially reduced as compared to response times previously obtained in the manner of the prior art. Not only is this construction relatively simple and inexpensive to implement, but it does so without adversely affecting the measurement system otherwise available.

It is therefore an object of the invention to improve the measurement response of a split flow mass flowmeter transducer.

It is a further object of the invention to effect the previous object with a construction that is relatively simple and inexpensive to implement, and which otherwise does not adversely affect operation of the system.

BRIEF DESCRIPTION OF THE DRAWINGS

FIG. 1 is a sectional view through a split flow mass flowmeter transducer in accordance with the prior art;

FIG. 2 is an enlarged section of the phantom outline portion of FIG. 1 as modified to incorporate the invention hereof;

FIG. 3 is an enlarged view as substantially seen along the lines 3—3 of FIG. 2;

Figure 5:
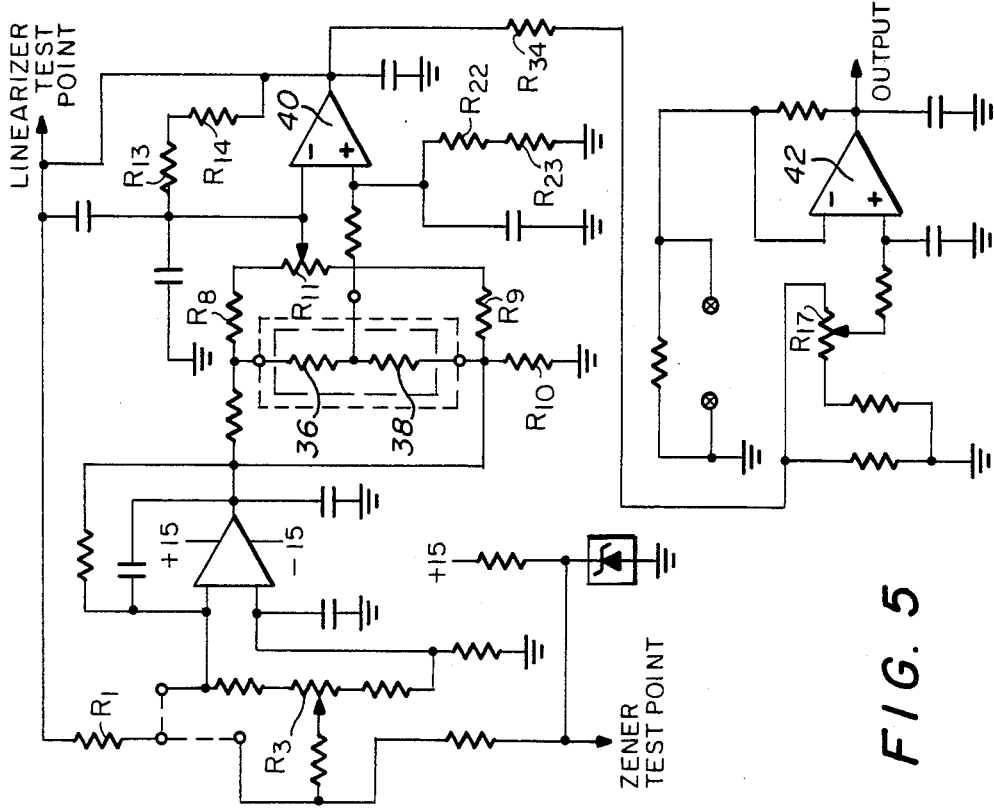
FIG. 5 is an electrical schematic by which readout measurements are obtained.

Referring first to FIG. 1, the apparatus thereof designated 8 is of a type commercially available and generally comprises a tubular body or housing 10 having an inlet 12 through which fluid flow is received and an outlet 14 through which the fluid flow is discharged. Within body 10, fluid flow is maintained laminar through central passage 16 via a flow control member 18 that includes a plurality of concentrically spaced apertures 20 communicating about the periphery of series arranged flow control member 22. Fluid flow peripherally enters control member 22 through a plurality of thinly stacked plates 24 from which the flow emerges through aperture 26 into the downstream section of passage 16 toward outlet 14. The flow path within passage 16 is generally represented by a plurality of arrows 28.

For enabling thermal measurement to be obtained, body 10 includes a pair of axially spaced radial bores 30 and 32 communicating with superposed apertures 46 and 48 in block 44 through which a predetermined portion of flow can be diverted into a thin walled small bore capillary 34 comprising a sensor tube. For low flow volumes, passage 16 can be blocked or otherwise eliminated, and the entire flow passed through sensor tube 34. About a central portion of tube 34 between the ballooned reference points 3 and 4 over a distance X, the tube is electrically heated via tightly coiled wires 36 and 38. Energy to the wires is applied via the electronic circuit as will be described below in connection with FIG. 5. As fluid flows through the heated portion X of the sensor tube, the upstream region tends to cool more than the downstream region, causing a temperature gradient along the length of the tube as represented by the A and B temperature profiles of FIG. 4. For any given fluid, the gradient is proportional to both the heat capacity of the fluid and the mass flow rate which is the product of the fluid density and the average molecular velocity through the tube. To minimize attitude sensitivity from convection currents, insulation (not shown) can be applied about the sensor tube.

For effecting flow rate measurement, the temperature gradient of the tube is detected by differentially measuring upstream and downstream temperatures as will briefly be described with respect to FIG. 5. As illustrated therein, heating coils 36 and 38 wrapped about sensor tube 34 form a Wheatstone bridge network with resistors R8, R9 and R11. The latter is adjusted to afford zero voltage at the input terminals of amplifier 40 in the absence of flow through tube 34. Power is supplied to the Wheatstone bridge network by a constant current power supply circuit, the current of which is adjustably presettable via resistor R3 while resistor R10 senses current in the bridge network.

With fluid flowing in tube 34, coils 36 and 38 are cooled by thermal transfer to the fluid causing decrease in their thermal resistance. With wire 38 being more upstream than wire 36, the former incurs a greater reduction in thermal resistance, thereby unbalancing the bridge and causing an output voltage to appear at the input terminals to amplifier 40. The output of the amplifier is then multiplied by a gain determined by resistors R13, R14, R22 and R23, and is delivered via resistor R34 to a final output amplifier 42, the gain of which is set by resistor R17. Output linearity is obtained by a feedback loop that includes a resistor R1 causing bridge supply current to increase slightly with increases in fluid flow in a manner yielding a substantially straight line response over the flow range of the flowmeter transducer. The value of output voltage can then be measured and converted into units of flow rate by techniques well known in the art.

Referring now to FIGS. 2 and 3, enhanced response for the flowmeter transducer in accordance with the invention is achieved via a thermal shunt about wires 36 and 38 and comprising slender wire 50. Wire 50 includes a notch 52 at each end for mounting into thermally conductive contact against sensor tube 34, while coiled wire spring clip 54 secures the shunt wire in position. In a preferred embodiment, shunt wire 50 is of commercially pure aluminum of about 5/64th inch diameter (0.078 inches) and for the embodiment being described is of a larger O.D. than the sensor tube to which it is secured. To be operatively effective in obtaining the faster response sought to be achieved hereby, shunt wire 50 is preferably of a metal composition generally characterized by high thermal conductivity, low thermal mass and high thermal diffusivity. Compositions other than aluminum that would be suitably functional are copper and silver, although the relatively high cost of the latter tends to make it economically less attractive than the others.

Figure 4:
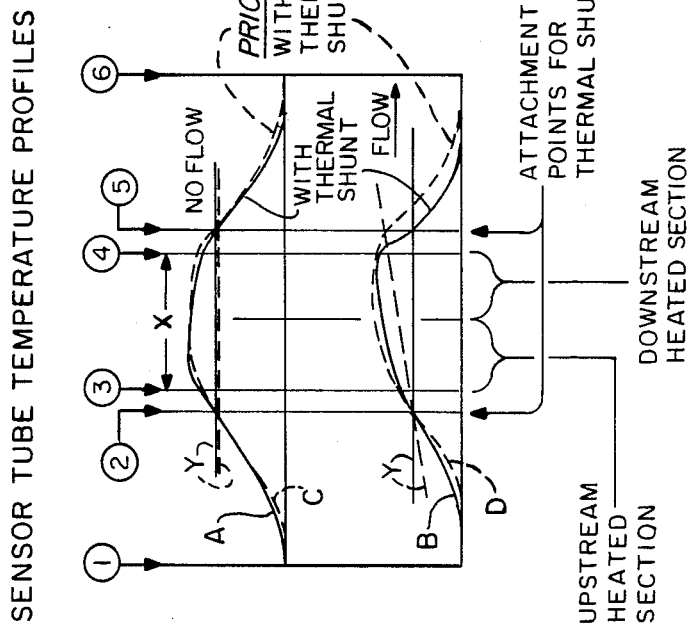
FIG. 4 is a graphic representation comparing the temperature profiles of the flowmeter of FIGS. 1 and 2.

For understanding the operational effect of shunt 50, reference is made to FIG. 4 from which the difference in temperature profiles in the manner of the invention as compared to the prior art can be appreciated. Ballooned locations 1 and 6 on sensor tube 24 represent the upstream and downstream ends of the sensor tube (see also FIG. 1) that are at substantially ambient temperature because of their proximity to the relatively massive block 44 and body 10 of the transducer. Heated section X of the sensor tube 24 is contained between point locations 3 and 4 while point locations 2 and 5 represent the locations at which the thermal shunt 50 is mounted on the tube. Profiles A and C represent the temperature profiles at zero flow for the constructions of FIGS. 1 and 2, respectively, and are for practical purposes substantially identical. Profiles B and D, respectively, similarly represent a condition of flow within the transducer. A straight line extending between the point locations 2 and 5 for each of the curves and designated Y will be explained.

Bearing in mind that as mentioned supra the output of the transducer is proportional to the difference in average temperature occurring within the upstream and downstream sections of the tube over the distance X between the point locations 3 and 4, the shape of the profile between points 2 and 5 is significant to the measurement of flow. That is, any uniform change or floating of the profile between points 2 and 5 has no bearing on the measurement, while a change in tilt or angle of the profile bears directly on the measurement being obtained.

For the horizontal projection of line Y on curves A and C, it can be appreciated that in the absence of flow, locations 2 and 5 are at the same temperature. However, from the tilt profile of line Y on curve D, it can be seen that the temperatures at points 2 and 5 are different and are affected by the temperature profiles at the end sections upstream and downstream thereof. As a consequence, the transducer output for a condition of flow in the prior art construction of FIG. 1 is related to the entire temperature profile extending between locations 1 and 6. Because of the long conduction path and large thermal mass associated with the end sections of the sensor tube 24, it produces a relatively slow response time to reach temperature equilibrium for conditions of changing flow rate and in turn has resulted in the relative inaccuracy of measurement obtained therefrom during flow transients.

In contrast with the above, the tilt of line Y in curve B is rendered independent of the end section by virtue of the thermal shunt 50 which passes heat freely between the point locations 2 and 5 as to maintain these points at substantially the same temperature at all times. With the temperature affect of the end sections eliminated, the response time for the transducer to effect accuracy of measurement concomitantly with changes in flow rate through the meter functions as if its length were limited to the distance between the point locations 2 and 5 and without the excessive heat loss that a short sensor tube would create.

By the above description there is disclosed a novel structure for improving the response time to obtain measurements in a split flow mass flowmeter transducer so as to effectively enhance the accuracy thereof. This is achieved with a relatively inexpensive component that can be easily installed on either new products or conversion of old products in view of the minimal changes that are required for fabrication.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a flowmeter transducer for measuring the flow rate of fluid flowing through the meter, including tubular means defining an elongated flow passage for fluid to be metered and heating means adapted to locally heat said tubular means for thermally obtaining a signal correlated to the flow rate measurements of fluid flowing in said passage; the improvement comprising thermal shunt means mounted in thermal contact on said tubular means in a shunting relation to the locality of said heating means to conduct heat transfer for pursuing a floating flow rate equalization of temperatures between predetermined locations on said tubular means upstream and downstream of said heating means.

2. In a flowmeter transducer for measuring the flow rate of fluid flowing through the meter, including a body defining an elongated central flow passage, a branch tube connected to said body in communication with said body passage at displaced locations in the direction of fluid flow for effecting a second flow passage arranged parallel to said central flow passage, and heating means adapted to locally heat said branch tube for thermally obtaining a signal correlated to the flow rate measurements of the flowing fluid; the improvement comprising thermal shunt means mounted in thermal contact on said branch tube in a shunting relation to the locality of said heating means to conduct heat transfer for pursuing a floating flow rate equalization of temperatures between predetermined locations on said tube upstream and downstream of said heating means.

3. The improvement according to claims 1 or 2 in which said thermal means comprises a thin wire of composition characterized by comparatively high thermal conductivity for pursuing floating temperature equalization between said predetermined locations.

4. In a flow meter transducer for measuring the flow rate of fluid flowing through the meter, including tubular means defining an elongated flow passage for fluid to be metered and heating means adapted to locally heat said tubular means for thermally obtaining a signal correlated to the flow rate measurements of fluid flowing in said passage; the improvement comprising thermal means mounted in thermal contact on said tubular means in a shunting relation to the locality of said heating means to conduct heat transfer between predetermined locations on said tubular means upstream and downstream of said heating means, said thermal means comprising a thin wire of composition characterized by comparatively high thermal conductivity for pursuing temperature equalization between said predetermined locations.

5. In a flowmeter transducer for measuring the flow rate of fluid flowing through the meter, including a body defining an elongated central flow passage, a branch tube connected to said body in communication with said body passage at displaced locations in the direction of fluid flow for effecting a second flow passage arranged parallel to said central flow passage, and heating means adapted to locally heat said branch tube for thermally obtaining a signal correlated to the flow rate measurements of the flowing fluid; the improvement comprising thermal means mounted in thermal contact on said branch tube in a shunting relation to the locality of said heating means to conduct heat transfer between predetermined locations on said tube upstream and downstream of said heating means, said thermal means comprising a thin wire of composition characterized by comparatively high thermal conductivity for pursuing temperature equalization between said predetermined locations.

6. The improvement according to claims 4 or 5 in which said wire is a metal selected from the group consisting of aluminum, copper and silver.

7. The improvement according to claims 4 or 5 in which said wire comprises aluminum.

8. The improvement according to claims 4 or 5 including means for securing said mounted wire in said thermal contact.

9. The improvement according to claim 5 in which the cross-sectional dimension of said wire is greater than the cross-sectional dimension of said branch tube.

* * * * *